US007478932B2

(12) United States Patent
Chinniah et al.

(10) Patent No.: US 7,478,932 B2
(45) Date of Patent: Jan. 20, 2009

(54) HEADLAMP ASSEMBLY HAVING COOLING CHANNEL

(75) Inventors: Jeyachandrabose Chinniah, Canton, MI (US); Edwin M. Sayers, Saline, MI (US); Harvinder Singh, Shelby Township, MI (US); James D. Tarne, West Bloomfield, MI (US); Alan J. Duszkiewicz, Livonia, MI (US); Paul A. Lyon, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 56 days.

(21) Appl. No.: 11/289,117

(22) Filed: Nov. 29, 2005

(65) Prior Publication Data

US 2007/0121336 A1 May 31, 2007

(51) Int. Cl.
*B60Q 1/00* (2006.01)

(52) U.S. Cl. ........................ 362/507; 362/547; 362/373; 362/545

(58) Field of Classification Search ................. 362/507, 362/547, 101, 294, 373, 345
See application file for complete search history.

(56) References Cited

U.S. PATENT DOCUMENTS 1,681,153 A 8/1928 Johnston
3,309,565 A 3/1967 Clark et al.
3,539,799 A 11/1970 Dangauthier
3,639,751 A 2/1972 Pichel
4,085,248 A 4/1978 Zehender et al.
4,168,522 A 9/1979 Van de Laarschot et al.
4,598,347 A 7/1986 Peppers
4,724,515 A 2/1988 Matsuki et al.
4,729,076 A 3/1988 Masami et al.
4,780,799 A 10/1988 Groh
4,931,912 A 6/1990 Kawakami et al.
4,937,710 A 6/1990 Hurley et al.
4,978,890 A 12/1990 Sekiguchi et al.
5,172,973 A 12/1992 Spada
5,406,467 A 4/1995 Hashemi
5,458,505 A 10/1995 Prager
5,758,955 A 6/1998 Belliveau
5,857,767 A 1/1999 Hochstein (Continued)

FOREIGN PATENT DOCUMENTS

FR 2 701 756 2/1993

(Continued)

OTHER PUBLICATIONS

English Abstract of Japanese Publication No. JP 5 235224.

*Primary Examiner*—Stephen F Husar
*Assistant Examiner*—Jessica L McMillan
(74) *Attorney, Agent, or Firm*—Brinks Hofer Gilson & Lione

(57) ABSTRACT

A headlamp assembly for a motor vehicle having a light source, a chamber that receives the light source and a cooling channel for removing heat from the chamber. A conductive wall and an insulating wall cooperate to define the chamber and the channel. The conductive wall has a substantially higher thermal conductivity than the insulating wall to promote the heat exchange between the chamber and the cooling channel and to reduce heat exchange between the cooling channel and the relatively hot engine compartment.

20 Claims, 3 Drawing Sheets

U.S. PATENT DOCUMENTS

| | | | |
|---|---|---|---|
| 5,947,592 A | 9/1999 | Barlow | |
| 6,021,954 A | 2/2000 | Kalwa et al. | |
| 6,045,248 A | 4/2000 | Ashizawa | |
| 6,071,000 A | 6/2000 | Rapp | |
| 6,183,114 B1 | 2/2001 | Cook et al. | |
| 6,210,024 B1 | 4/2001 | Shida | |
| 6,224,247 B1 | 5/2001 | Ashizawa | |
| 6,367,949 B1 | 4/2002 | Pederson | |
| 6,402,346 B1 | 6/2002 | Liao et al. | |
| 6,419,382 B1 | 7/2002 | Nakagawa et al. | |
| 6,497,507 B1 | 12/2002 | Weber | |
| 6,558,026 B2 | 5/2003 | Strazzanti | |
| 6,595,672 B2 | 7/2003 | Yamaguchi | |
| 6,634,771 B2 | 10/2003 | Cao | |
| 6,648,495 B1 | 11/2003 | Hsu | |
| 6,676,283 B2 | 1/2004 | Ozawa et al. | |
| 6,682,211 B2 | 1/2004 | English et al. | |
| 6,773,154 B2 | 8/2004 | Desai | |
| 6,860,620 B2 | 3/2005 | Kuan et al. | |
| 6,864,513 B2 | 3/2005 | Lin et al. | |
| 6,910,794 B2 | 6/2005 | Rice | |
| 2002/0141188 A1 | 10/2002 | Basey | |
| 2002/0154514 A1 | 10/2002 | Yagi et al. | |
| 2002/0167818 A1 | 11/2002 | Yoneima | |
| 2003/0002179 A1 | 1/2003 | Roberts et al. | |
| 2003/0043586 A1* | 3/2003 | Sagal et al. | 362/341 |
| 2003/0218885 A1 | 11/2003 | Ishizaki | |
| 2004/0012975 A1 | 1/2004 | Chase et al. | |
| 2004/0085768 A1 | 5/2004 | Kai et al. | |
| 2004/0120156 A1 | 6/2004 | Ryan | |
| 2004/0145909 A1 | 7/2004 | Ognian et al. | |
| 2004/0149054 A1 | 8/2004 | Soga et al. | |
| 2004/0202007 A1 | 10/2004 | Yagi et al. | |
| 2004/0213016 A1 | 10/2004 | Rice | |
| 2005/0024864 A1 | 2/2005 | Galli | |
| 2005/0094414 A1 | 5/2005 | Ishida et al. | |
| 2006/0181894 A1* | 8/2006 | Chinniah et al. | 362/547 |

FOREIGN PATENT DOCUMENTS

| | | |
|---|---|---|
| FR | 2 698 055 | 5/1994 |
| JP | 5 235224 | 10/1993 |

* cited by examiner

HEADLAMP ASSEMBLY HAVING COOLING CHANNEL

BACKGROUND

1. Field of the Invention

The invention relates generally to a headlamp assembly for a motor vehicle. More specifically, the invention relates to the providing of airflow to cool the headlamp assembly.

2. Related Technology

Headlamp assemblies have a light source, such as an incandescent lamp, a light emitting diode (LED) or high intensity discharge (HID) lamp, positioned within a headlamp chamber and electrically connected to a power source. The headlamp chamber is typically defined by a transparent or translucent lens, located forward of the light source, and a reflector located rearward and/or surrounding the light source. As used herein, the terms forward and rearward are referenced with respect to the position of the light source and the direction in which the light from the source is intended to be seen. Thus light from the assembly is intended to be seen from a forward position.

During an operation cycle of the headlamp assembly, the light sources and other components of the lamp generate heat while "on" and cool while "off", causing the chamber to undergoes temperature fluctuation and causing the air located within to expand and contract. To maintain a relative-constant chamber pressure, the chamber typically includes at least one opening that permits an air exchange between the chamber and the ambient air. However, to prevent contaminants, such as dust and debris, from entering the chamber, the opening is typically relatively small and is covered with an air-permeable membrane.

In order to attain designed optimal performance of newer light sources, LED'S and their electrical components in the lamp assembly, it is desirable to maintain the internal temperature of the lamp assembly below the maximum operating temperature Therefore, it is advantageous to provide the headlamp assembly with a mechanism that cools the chamber and the LED'S located therein.

Headlamp assemblies are typically secured to a portion of the vehicle frame that is adjacent to the engine compartment. The temperature within the engine compartment is often significantly higher than the temperature outside of the engine compartment (the ambient temperature). For example, during operation of the vehicle various components, such as the engine and the engine cooling system, output heated air into the engine compartment. As another example, during periods of vehicle use and nonuse, the air trapped within the engine compartment may become heated by solar energy. Therefore, it is advantageous to provide the headlamp assembly with a mechanism that isolates the chamber and the light sources located therein from the relatively high temperatures of the engine compartment.

In view of the above, it is beneficial to have a headlamp assembly that has a mechanism that effectively cools the mechanism's internal components while minimizing air exchange between the headlamp assembly chamber and the atmosphere and while isolating the chamber from the engine compartment and the relatively high temperatures associated therewith.

SUMMARY

In overcoming the above limitations and other drawbacks, a headlamp assembly for a motor vehicle is provided that includes a light source, a chamber that receives the light source, and a cooling channel for removing heat from the chamber. The headlamp assembly also includes a conductive wall and an insulating wall that cooperate to define the chamber and the channel. For example, the conductive wall has a first surface defining the chamber and a second surface that cooperates with the insulating wall to define the cooling chamber. The conductive wall has a substantially higher thermal conductivity than the insulating wall to promote the heat exchange between the chamber and the cooling channel and to reduce heat exchange between the cooling channel and the relatively hot engine compartment.

In one aspect of the present invention, the insulating wall thermal conductivity is less than or equal to 5.0 W/(m·K), where W=Watts, m=meter and K=Degrees Kelvin and the conductive wall thermal conductivity is greater than or equal to 10.0 W/(m W/(m·K). In a more preferred design, the insulating wall thermal conductivity is less than or equal to 1.0 W/(m·K) and the conductive wall thermal conductivity is greater than or equal to 20 W/(m·K). In an even more preferred design, the insulating wall thermal conductivity is less than or equal to 0.5 W/(m·K) and the conductive wall thermal conductivity is greater than or equal to 50 W/(m·K).

The conductive wall is made of a conductive material, such as a metal, a metal alloy, or a graphite material. In one design, the conductive wall includes a plurality of conductive materials, such as metal, metal alloy, silicon, or graphite materials, embedded within a base material, such as a polymer. In this design, the conductive components improve the conductivity of the wall, while base material serves as a relatively light, moldable support structure for the conductive components. The insulating wall is made of an insulating material, such as a glass or polymer material.

In another aspect, the headlamp assembly includes a divider extending between the conductive wall and the insulating wall to define a plurality of cooling channel portions. The divider extends into the chamber to promote the heat exchange between the chamber and the cooling channel. More specifically, the portion of the divider extending into the chamber conducts heat from the chamber into the cooling channel.

In yet another aspect, an inlet is located adjacent to a bottom portion of the headlamp assembly and an outlet is located adjacent to a top portion of the headlamp assembly. This configuration promotes the migration of relatively hot air towards the outlet by utilizing natural properties of fluids. Furthermore, the inlet and the outlet are configured so that air currents caused by the movement of the vehicle naturally flow in the upward direction, from the inlet to the outlet.

To further promote heat exchange between the chamber and the cooling channel, the headlamp assembly further includes a thermoelectric device (TED) coupled to the conductive wall. For example, the thermoelectric device has a plate with a first portion positioned within the cooling channel and a second portion positioned within the chamber, and the thermoelectric device (TED) is in electrical connection with a power source. An electrical current is provided from the power source to the TED such that the first portion becomes cooler than the second portion, thus promoting air from the chamber to undergo heat exchange with the air in the cooling channel.

As another aspect, the mechanism for promoting heat exchange between the chamber and the cooling channel, also includes a plurality of fins extending from the light source to promote heat transfer from the light source to the chamber. For example, the fins conduct heat away from the light source, in the direction of the cooling channel, into the chamber air. Therefore, the fins are preferably formed of a conductive material, such as metal.

Further objects, features and advantages of this invention will become readily apparent to persons skilled in the art after a review of the following description, with reference to the drawings and claims that are appended to and form a part of this specification.

DETAILED DESCRIPTION

Figure 1:
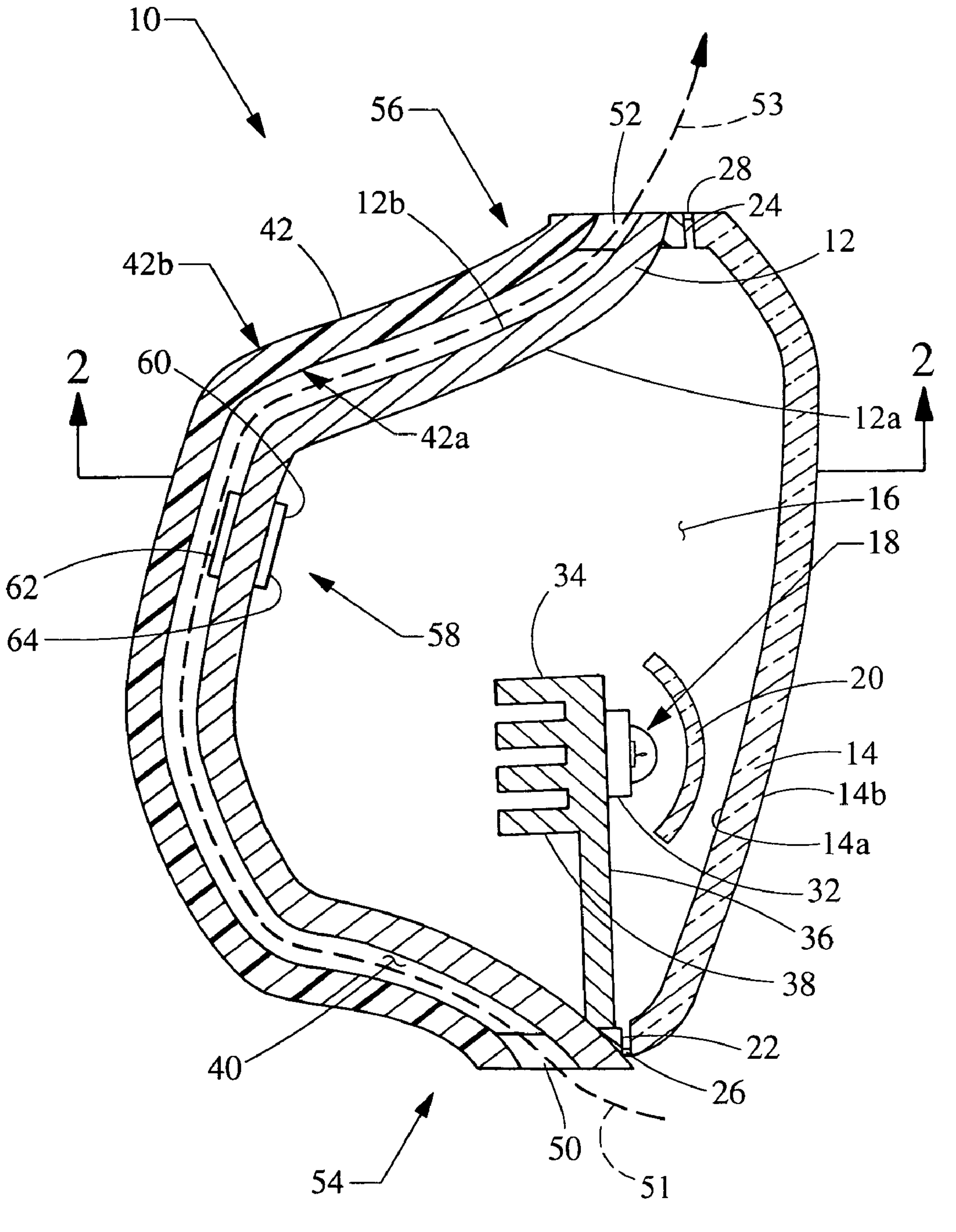
FIG. 1 shows a cross-sectional view of a headlamp assembly for a motor vehicle embodying the principles of the present invention.
Figure 2:
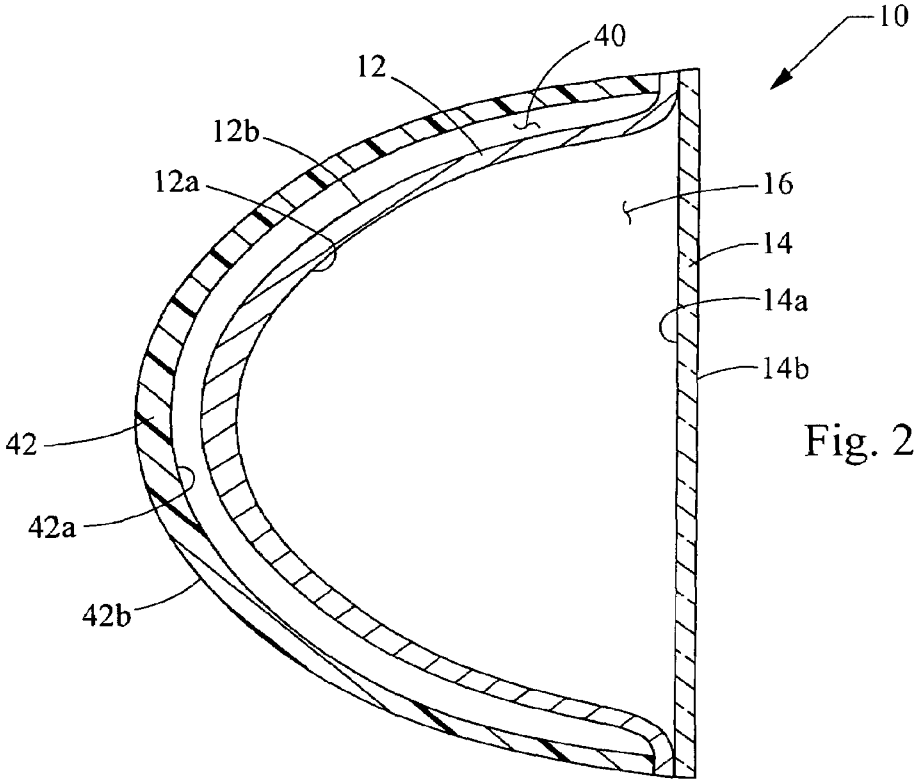
FIG. 2 is a cross-section taken along line 2-2 in FIG. 1 showing the cooling channel.

Referring now to the drawings, FIG. 1 shows a headlamp assembly 10 having a thermally conductive wall 12 and a lens 14 cooperating to define a chamber 16 for a light emitting device 18, such as a light emitting diode (LED). For example, the thermally conductive wall 12 includes an inner surface 12*a* and an outer surface 12*b*; the lens 14 includes an inner surface 14*a* and an outer surface 14*b*; and the thermally conductive wall inner surface 12*a* and the lens inner surface 14*a* cooperate to define the chamber 16. The thermally conductive wall 12 is preferably opaque and made of a material having a relatively high thermal conductivity, as will be discussed further below, and the lens 14 is preferably a transparent or translucent and made of a plastic such as polycarbonate.

The headlamp assembly 10 includes surfaces that cooperate to focus the light rays into a beam having desired characteristics and direct the light rays towards the lens 14. For example, an interior reflector 20 is positioned within the chamber 16 for re-directing the forward-directed rays at the thermally conductive wall inner surface 12*a*, which is preferably a light-reflecting surface. Inner surface 12*a* reflects the rays in the forward direction toward and through the lens 14.

The thermally conductive wall 12 and the lens 14 are connected with each other such that the chamber 16 is substantially sealed from the atmosphere. The chamber 16 is, however, provided with a pair of pressure vents 22, 24. Both vents 22, 24 are relatively small openings between the thermally conductive wall 12 and the lens 14 that permit a relatively small amount of airflow into and out of the chamber 16 to account for air pressure fluctuations during temperature changes within the chamber 16. Alternatively, the number of vents in the headlamp assembly 10 and their location may be varied as required by various design criteria.

In order to restrict contaminants such as dust and debris from entering the chamber, vent covers 26, 28 are positioned over the vents 22, 24. The vent covers 26, 28 also substantially prevent moisture from accumulating within the chamber 16 by permitting moisture to permeate and drain out of the vents 22, 24 and while preventing water from entering into the chamber 16. The vent covers 26, 28 shown in the figures are thus composed of an air/moisture-permeable membrane, such as GORE-TEX®, but any appropriate material may be used.

The light source 18, hereinafter just "LED 18", is attached to a printed circuit board (PCB) 32 that includes electronic controls and connections for the LED 18. Furthermore, the LED 18 and the PCB 32 are supported by a heat sink 34 having heat exchange fins 38 that conduct heat away from the LED 18, as will be further discussed below. The heat sink 34 is constructed of a material having a relatively high thermal conductivity, and is connected to the thermally conductive wall 12 by a support post 36. The post 36 thus supports the LED 18 and contains the electrical connectors (not shown) extending between the LED 18 and a power source. The support post 36 is preferably connected to the thermally conductive wall 12 by any suitable connection, such as welding or fastening. Alternatively, the respective components 12, 36 are formed as a single, unitary component.

During operation of the headlamp assembly 10, the LED 18 generates heat and increases the temperature of the air, components and structures located within the chamber 16. However, the LED 18 and/or other electronic components may experience diminished performance or failure if their maximum operating temperature is exceeded. To reduce the temperature of these components, the headlamp assembly 10 of the present invention therefore includes a cooling channel 40 that extends adjacent to and extracts heat from the chamber 16.

The cooling channel 40 is defined in part by a thermally insulating wall 42 having an inner surface 42*a* and an outer surface 42*b*, wherein the insulating wall inner surface 42*a* cooperates with the thermally conductive wall outer surface 12*b* to define the cooling channel 40. Additionally, the cooling channel 40 includes an inlet 50 for receiving a relatively cool inlet airflow 51 from the atmosphere and an outlet 52 for venting a relatively warm outlet airflow 53 back into the atmosphere. The inlet 50, which is positioned adjacent to the bottom 54 of the headlamp assembly 10, is lower than the outlet 52, which is positioned adjacent to the top 56 of the headlamp assembly 10. This construction promotes natural convective airflow through the channel 40. Therefore, even while the vehicle is stationary, the cool inlet airflow 51 is naturally drawn into the channel 40 from the atmosphere.

The thermally conductive wall 12 and the thermally insulating wall 42 are preferably spaced apart from each other along their respective lengths so that the cooling channel 40 has a substantially constant width; thereby minimizing flow loss across the cooling channel 40.

Figure 4:
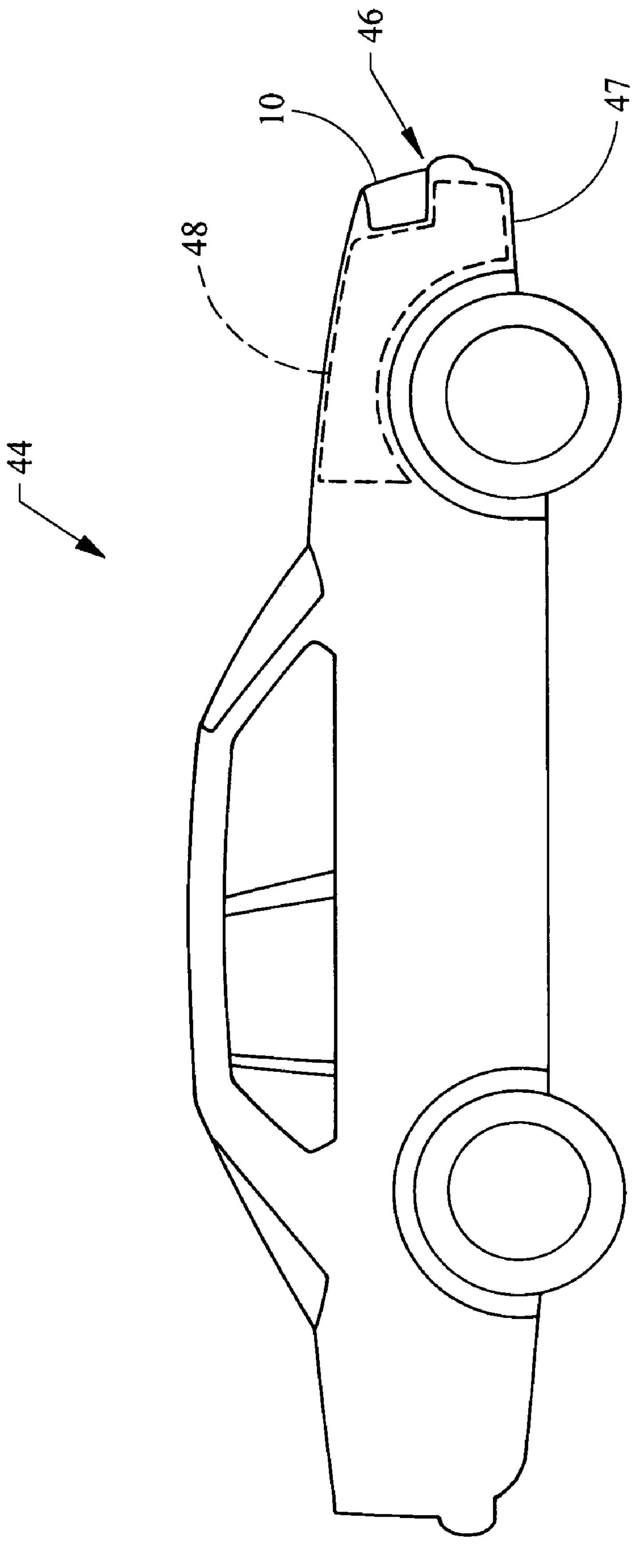
FIG. 4 is a side view of a motor vehicle incorporating the headlamp assembly shown in FIG. 1.

As seen in FIG. 4, the headlamp assembly 10 is placed near a front portion 45 of the motor vehicle 44 and adjacent to the engine compartment 48. More specifically, the headlamp assembly 10 is positioned such that when the motor vehicle 44 is moving, a stream of fresh air from the atmosphere flows past, and some into, the inlet 50 of the headlamp assembly 10 as the cool inlet airflow 51. An air duct or opening (generally indicated by reference numeral 46) defined by the front portion 45 of the vehicle body, such as the bumper, may be positioned near the inlet 50 to further promote the inflow of cool air 51. Alternatively, the air duct or opening may be positioned along the underside 47 of the motor vehicle 44 so as to capture naturally-flowing fresh air during movement of the motor vehicle 44. To the extent possible, the inlet 50 is preferably positioned away from any heat source. For example, the inlet 50 is preferably located in a relatively forward location of the headlamp assembly 10, such as in a location adjacent to the lens 14 of the assembly. This location of the inlet 50 reduces the likelihood that the inlet airflow 51 absorbs heat from the relatively hot components of the engine compartment 48 before entering the cooling channel 40.

The headlamp assembly 10 shown in the figures includes various mechanisms for increasing the heat transfer between the LED 18 and the cooling channel 40. As mentioned above, the heat exchange fins 38 conduct heat away from the LED 18 and towards the thermally conductive wall 12. Additionally, the connector post 36 conducts heat directly to the thermally conductive wall 12. Therefore, the heat exchange fins 38 and the connector post 36 are both preferably made of a material with a relatively high thermal conductivity, such as a material having a thermal conductivity that is greater than or equal to 10.0 W/(m·K). More preferably, the heat exchange fins 38 and the connector post 36 are made of a material having a thermal conductivity that is greater than or equal to 20 W/(m·K). Even more preferably, the heat exchange fins 38 and the connector post 36 are made of a material having a thermal conductivity that is greater than or equal to 50 W/(m·K). For example, the heat exchange fins 38 and the connector post 36 are made of a metal, a metal alloy, silicon, or a graphite material. In a more specific example, the heat exchange fins 38 and the connector post 36 are made of aluminum. In another example, the heat exchange fins 38 and the connector post 36 include a plurality of conductive components, such as a metal, a metal alloy, a silicon, or a graphite material, embedded within a base material, such as a polymer. In this design, the conductive components improve the conductivity of the wall, while base material serves as a relatively light, moldable support structure for the conductive components.

After being conducted away from the heat exchange fins 38, the heat from the LED 18 is transferred to the thermally conductive wall 12 by natural convection. Although the airflow through the chamber 16 is relatively low due to its substantially sealed nature, natural temperature gradients cause the heated air near the tips of the heat exchange fins 38 to flow towards the thermally conductive wall 12; thereby improving convection between the fins 38 and the wall 12.

Next, the thermally conductive wall 12 serves as a second mechanism for increasing the heat transfer between the LED 18 and the cooling channel 40. More specifically, the thermally conductive wall 12 conducts heat from the chamber 16 into the cooling chamber 40, where heated air is distributed into the atmosphere as discussed above. Therefore, the thermally conductive wall 12 is made of a material with a relatively high thermal conductivity, such as a material having the preferred thermal conductivities previously mentioned above. Examples of materials for the thermally conductive wall 12 include metal, metal alloy, silicon, or graphite material, and more specifically, aluminum. In another example, the thermally conductive wall 12 may include a plurality of conductive components, such as a metal, a metal alloy, or a graphite material, embedded within a base material, such as a polymer. In this design, the benefits discussed above are equally applicable.

A thermoelectric device (TED) 58 serves as a third mechanism for increasing the heat transfer between the LED 18 and the cooling channel 40. The TED 58 shown in FIG. 1 is positioned in the wall 12 and includes a first surface 62 facing into the cooling channel 40 and a second surface 64 facing into the chamber 16. The construction of the TED 58, as is of a know construction and need not be further discussed herein. As an electrical current from a power source (not shown) is provided to the TED 58, a temperature differential forms between the first portion 62 and the second portion 64. More specifically, as the current travels through the TED 58, the first portion 62 becomes hotter and the second portion 64 becomes cooler. This temperature differential increases the heat exchange between the chamber 16 and the channel by drawing an increased amount of heat into the cooling channel 40. Alternatively, the TED 58 may be run in reverse by reversing the flow of current through the TED 58.

The headlamp assembly 10 also includes various mechanisms for insulating the cooling channel 40 from the relatively hot temperatures of the engine compartment 48. First, as discussed above, the inlet 50 of the cooling channel 40 is preferably positioned away from the engine compartment 48 to reduce the likelihood that the inlet airflow 51 absorbs heat from the relatively hot components of the engine compartment 48 before entering the cooling channel 40. It may, however, be beneficial to position the outlet 52 of the cooling channel 40 adjacent to the engine compartment 48 so as to increase the temperature gradient between the inlet 50 and the outlet 52 and thereby increase the natural airflow velocity therebetween.

The thermally insulating wall 42 serves as a second mechanism for insulating the cooling channel 40 from the relatively hot temperatures of the engine compartment 48. More specifically, the thermally insulating wall 42 is preferably made of a material with a relatively low thermal conductivity, such as a material having a thermal conductivity that is less than or equal to 5.0 W/(m·K). More preferably, the thermally insulating wall 42 is made of a material having a thermal conductivity that is less than or equal to 1.0 W/(m·K). More preferably, the thermally insulating wall 42 is made of a material having a thermal conductivity that is less than or equal to 0.5 W/(m·K) and even more preferably the thermal conductivity is less than or equal to 0.2 W/(m·K). As such, the thermally insulating wall 42 may be made of glass, such as soda-lime glass, borosilicate glass; a ceramic, such as pyroceram; or a polymer such as rubber, epoxy, nylon, phenolic, polybutylene terephthalate (PBT), polycarbonate (PC), polyester, polyethylene (PE), polyethylene terephthalate (PET), polyimide, polymethyl methacrylate (PMMA), polypropylene (PP), polystyrene (PS), polytetrafluoroethylene (PTFE), polyvinyl chloride (PVC), or silicone. In a more specific example, the thermally insulating wall 42 is made of polypropylene.

By defining the cooling chamber 40 between the thermally conductive wall 12 and the thermally insulating wall 42, the headlamp assembly 10 is able to promote desirable types of heat transfer and prevent undesirable types of heat transfer, while minimizing part complexity and part cost. For example, the cooling chamber 40 has a generally large surface because it extends along the entire surface of the thermally conductive wall 12. As another example, the cooling chamber 40 is formed with minimal part complexity and part cost because it is formed by coupling two walls 12, 42, each having a relatively low part complexity, adjacent to each other.

Figure 3:
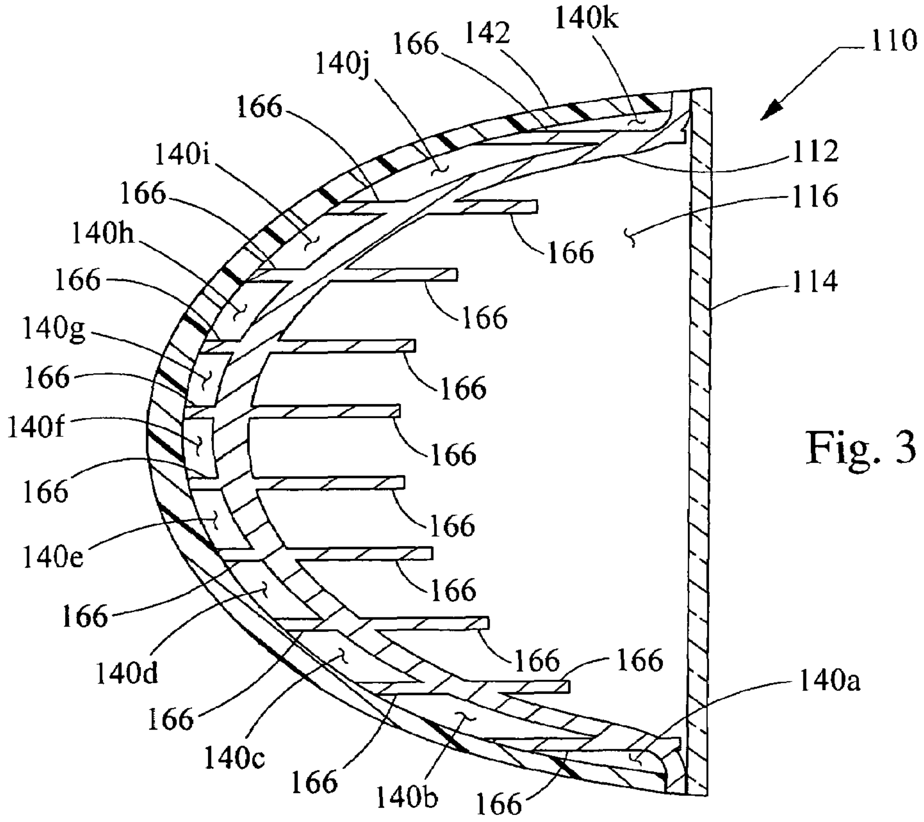
FIG. 3 is a cross-section generally similar to FIG. 2 of an alternative embodiment of the present invention.

Referring now to FIG. 3, an alternative embodiment of the present invention is shown in the similar cross-sectional view to that taken generally along the lines 2-2 of FIG. 1. More specifically, a headlamp assembly 110 is shown having a thermally conductive wall 112 and a lens 114 cooperating to define a chamber 116 for a light emitting source, such as a light emitting diode or other device. The thermally conductive wall 112 includes an inner surface **112*a* and an outer surface 112*b* and the lens 114 includes an inner surface 114*a* and an outer surface 114*b*. The thermally conductive wall inner surface 112*a* and the lens inner surface 114*a* thus cooperate to define the chamber 116. The headlamp assembly 110 also includes a cooling channel 140 that extends adjacent to and extracts heat from the chamber 116**.

A plurality of dividers 166 extends between the thermally conductive wall 112 and the thermally insulating wall 142. The dividers define a plurality of cooling channel portions **140*a*, 140*b*, 140*c*, 140*d*, 140*e*, 140*f*, 140*g*, 140*h*, 140*i*, 140*j*, and 140*k* within the channel 140 itself. Although eleven cooling channel portions are shown in FIG. 3, any suitable number of cooling channel portions may be used. The dividers 166 also extend through the thermally conductive wall 112 into the chamber 116 to promote the heat exchange between the chamber 116 and the cooling channel 140 via conduction. Furthermore, the dividers 166 increase the surface area of components conducting heat into the cooling channel 140 to further promote the heat exchange. The dividers 166 and the thermally conductive wall 112 are formed as a single, unitary component, but any other suitable configuration may be used. Additionally, the dividers 166 in FIG. 3 extend substantially completely along the height of the headlamp assembly 110 (where the height extends in a direction between the inlet and the outlet shown in FIG. 1). However, the dividers 166** may alternatively extend along only a portion of the height, may be aligned with one another or may be offset from one another.

It is therefore intended that the foregoing detailed description be regarded as illustrative rather than limiting, and that it be understood that it is the following claims, including all equivalents, that are intended to define the spirit and scope of this invention.

What is claimed is:

1. A headlamp assembly for a motor vehicle comprising:
- a lens;
- a conductive wall having a conductive wall inner surface and a conductive wall outer surface, the conductive wall inner surface cooperating with the lens to substantially define a chamber that is generally fluidly isolated from the atmosphere;
- a light source located within the chamber; and
- an insulating wall located outside of the chamber and having an insulating wall inner surface spaced apart from the conductive wall outer surface and cooperating to define a cooling channel therebetween to promote heat exchange between the chamber and the cooling channel, the cooling channel extending between an inlet and an outlet in fluid communication with the atmosphere;
- wherein the conductive wall has a thermal conductivity that is substantially higher than that of the insulating wall to promote the heat exchange between the chamber and the cooling channel.

2. A headlamp assembly as in claim 1, wherein the insulating wall thermal conductivity is less than or equal to 5.0W/(m·K) and the conductive wall thermal conductivity is greater than or equal to 10.0W/(m·K).

3. A headlamp assembly as in claim 2, wherein the insulating wall thermal conductivity is less than or equal to 1.0 W/(m·K) and the conductive wall thermal conductivity is greater than or equal to 20 W/(m·K).

4. A headlamp assembly as in claim 3, wherein the insulating wall thermal conductivity is less than or equal to 0.5 W/(m·K) and the conductive wall thermal conductivity is greater than or equal to 50 W/(m·K).

5. A headlamp assembly as in claim 4, wherein the insulating wall thermal conductivity is less than or equal to 0.2 W/(m·K) and the conductive wall thermal conductivity is greater than or equal to 50 W/(m·K).

6. A headlamp assembly as in claim 1, wherein the conductive wall includes a base material and a plurality of conductive components supported by the base material.

7. A headlamp assembly as in claim 6, wherein the base material is a polymer.

8. A headlamp assembly as in claim 6, wherein the conductive components are of a material selected from the following group: metal, metal alloy, silicon, and graphite.

9. A headlamp assembly as in claim 1, wherein the conductive wall includes a conductive material selected from the following group: metal, metal alloy, silicon, and graphite.

10. A headlamp assembly as in claim 9, wherein the insulating wall is of an insulating material selected from the following group: glass, ceramic, and plastic.

11. A headlamp assembly as in claim 1, further comprising at least one divider extending into the cooling channel between the conductive wall and the insulating wall to define a plurality of cooling channel portions.

12. A headlamp assembly as in claim 11, wherein the at least one divider extends into the chamber from the conductive wall.

13. A headlamp assembly as in claim 1, wherein the inlet is located adjacent to a bottom portion of the headlamp assembly and the outlet is located adjacent to a top portion of the headlamp assembly.

14. A headlamp assembly as in claim 1, further comprising a thermoelectric device located in the conductive wall to promote the heat exchange between the chamber and the cooling channel.

15. A headlamp assembly as in claim 1, wherein the conductive wall and the insulating wall are generally equidistantly spaced from each other.

16. A headlamp assembly as in claim 1, further comprising a plurality of fins coupled to the light source to promote heat transfer from the light source to air in the chamber.

17. A headlamp assembly as in claim 16, further comprising a connector post extending from the conductive wall supporting the light source.

18. A headlamp assembly as in claim 17, wherein the fins and the connector post include a metal material.

19. A headlamp assembly as in claim 1, wherein the headlamp assembly includes a front portion exposed to the atmosphere and a rear portion exposed to an engine compartment.

20. A headlamp assembly as in claim 1, wherein the conductive wall at least partially defines a reflector.

* * * * *